Patented July 27, 1954

2,684,951

UNITED STATES PATENT OFFICE 2,684,951

CATALYST CARRIER

Henry O. Mottern, Bloomfield, N. J., assignor to Standard Oil Development Company, a corporation of Delaware No Drawing. Application October 11, 1950, Serial No. 189,673

6 Claims. (Cl. 252—475)

This application is a continuation-in-part of Serial Number 137,903 filed January 10, 1950.

This invention relates to a novel catalyst carrier particularly a carrier for metallic oxide catalyst for use in various chemical reactions.

Numerous chemical reactions are carried out in the presence of catalysts which require deposition on catalyst supports. For example, the dehydrogenation of secondary alcohols to ketones is commonly accomplished by passing alcohol vapors at elevated temperatures over a catalytic metallic oxide supported on a carrier. Generally oxides of the metals of group II of the periodic table are employed with the addition thereto of metallic oxides of group III, group IV and/or group V as catalyst promoters, stabilizers, etc. For purposes of this invention the term metallic oxide dehydrogenation catalyst will designate an oxide of a metal, preferably of group II, and 1 to 15% by weight of a metallic oxide of the III, IV, and V group of the periodic table. During the dehydrogenation temperatures of 400° F. to 1000° F., generally 750° F. to 900° F. are employed. The catalytic metallic oxides function with a higher degree of efficiency when supported on a carrier than when used alone. Catalyst carriers commonly used are metallic machine turnings such as steel or brass turnings, metallic chips, pumice, alumina, porcelains, etc. of a size insuring good distribution of the oxide throughout the catalyst chamber. Metallic carriers have been afforded wide use commercially as a convenient, easily replaceable support.

These same metallic oxide catalysts have also been found to be effective for the preparation of ketones and aldehydes of increased molecular weight by condensation of ketones and aldehydes respectively. Typical condensation reactions of this type are as follows: the condensation of acetone with itself to form mesityl oxide; the reaction of mesityl acetone to form phorone and isophorone; the condensation of methyl ethyl ketone to form ethyl amylene ketone; the condensation of acetaldehyde to form crotonaldehyde; the reaction between acetone and acetaldehyde to form methyl normal butylene ketone; and the reactions of mixed aldehydes and ketones of the above types.

It has been found that relatively large size lumps of fused zirconia, which in itself is relatively catalytically inactive, is an excellent support for metallic oxide catalysts. It is considerably cheaper than metallic carriers, and catalysts coated thereon display longer stability and afford higher conversions than the same catalyst deposited on metallic carriers.

Fused zirconia is available as a by-product from the distillation of zirconia sands. The electrically fused zirconia mass can be broken into lumps of appropriate size for various uses. For purposes of this invention lumps or granules varying from the general size of ¼" cube to a ¾" cube, preferably about ½" cube, are desirable. These granules are hard, non-porous, irregular in shape, salmon to gray in color and have a porcelain-like finish. Quite unexpectedly the material is extremely stable when put through cycles of alternate heating and cooling. No signs of any appreciable crazing, cracking or disintegration occurs despite repeated washings, recoatings and re-use.

The catalyst is applied to the carrier by forming a slurry of the metallic oxide or oxides with water or other solvent until a paste-like consistency is obtained. The fused zirconia in the form of lumps or granules of the appropriate size, preferably about ½" x ½" x ½" is mixed with the oxide paste and the oxide deposited thereon by known methods such as by tumbling in a ball mill. During the tumbling operation the oxide becomes deposited on the fused zirconia leaving the exterior surface of the mass relatively smooth. The particles are removed and dried, and are then ready for use in the reactor.

Although the fused zirconia is an excellent catalyst carrier in itself, it has been found that even still better results are obtained if the fused zirconia is treated before use in the catalyst composition with an aqueous solution of an alkali such as sodium hydroxide, potassium hydroxide or ammonium hydroxide, preferably the latter. When the fused zirconia is preliminarily digested with aqueous alkali preferably at its boiling point for a period of 5 minutes to 2 hours, the resulting catalyst contained on the fused zirconia carrier produces a minimum of olefin formation in the conversion of secondary alcohols to ketones, and results in longer life of the catalyst.

The metallic oxides preferably employed in the dehydrogenation catalyst are selected from the following group: zinc oxide, magnesium oxide, copper oxide, beryllium oxide, chromium oxide; while the following oxides are employed as stabilizers and promoters where desired: bismuth oxide, antimony oxide, zirconium oxide, thorium oxide, cerium oxide, vanadium oxide, etc. The amount of the latter oxides used varies between 1 and 15 wt. percent preferably about 6 wt. percent based on the total weight of the mixture.

The following dehydrogenation runs in Table I demonstrate the effectiveness of the fused zirconia-base catalyst. The parts of the oxides employed as given are parts by weight.

ketones, its use is by no means limited thereto. The fused zirconia is suitable as a base for metallic oxide catalysts which catalyze the dehydrogenation of primary alcohols to their corresponding aldehydes, e. g. the dehydrogenation of ethyl alcohol to acetaldehyde. The material likewise is suitable for use in the dehydrogenation of hydrocarbons to produce hydrocarbons of greater unsaturation, e. g. the conversion of paraffins to mono-olefins and mono-olefins to diolefins.

The dehydrogenation is carried out in the usual manner already described in the art and the use of the fused zirconia as the catalyst base requires no modification of the reaction mechanism, or method of product recovery, etc. For example, the reaction conditions and process technique employed in the dehydrogenation of

*Table I*

DEHYDROGENATION OF ISOPROPANOL—ACETONE

| Run No. | Catalyst | Carrier | Feed Rate | Temp., °F. | Mol. Percent Conversion to— | | | |
|---|---|---|---|---|---|---|---|---|
| | | | | | Acetone | IPOH | PR= | Polymer, etc. |
| 220 | 94ZnO, 6Bi$_2$O$_3$ | Fused Zirconia | 1.5 | 750 | 90.15 | 5.38 | 2.2 | 2.2 |
| 207 | 94ZnO, 6ZrO$_2$ | do | 1.5 | 750 | 90.92 | 6.5 | 1.47 | 1.1 |
| 219 | 94ZnO, 6Bi$_2$O$_3$ (Treated with NH$_4$OH) | do | 1.5 | 750 | 90.8 | 6.6 | 0.93 | 1.7 |
| Life Test: | | | | | | | | |
| 207 | 94ZnO, 6ZrO$_2$ | do | 1.5 | 750 | 86.97 | 9.77 | 2.97 | 2.3 |
| 207A | 94ZnO, 6ZrO$_2$ | do | 6.0 | 750 | 68.24 | 30.23 | 0.76 | 0.7 |
| 207B | 94ZnO, 6ZrO$_2$ | do | 3.0 | 900 | 92.61 | 2.77 | 2.51 | 2.1 |
| 207C | 94ZnO, 6ZrO$_2$ | do | 1.5 | 750 | 90.92 | 6.5 | 1.47 | 1.1 |

DEHYDROGENATION OF SEC-BUTANOL—METHYL ETHYL KETONE

| Run No. | Catalyst | Carrier | Feed Rate | Temp., °F. | Mol. Percent Conversion to— | | | |
|---|---|---|---|---|---|---|---|---|
| | | | | | MEK | sec-BuOH | Bu= | Polymer, etc. |
| 173C | 94ZnO, 6Bi$_2$O$_3$ | Fused Zirconia | 1.5 | 750 | 96.2 | 2.4 | 1.5 | |
| 217 | 94ZnO, 6ZrO$_2$ | do | 1.5 | 750 | 83.1 | 14.0 | 3.6 | |
| 178 | 94ZnO, 6Bi$_2$O$_3$ | do | 1.5 | 750 | 87.5 | 8.5 | 0.6 | 3.2 |
| 197C | do (Treated with 5% NaOH) | do | 1.5 | 750 | 91.5 | 6.4 | 1.37 | |
| 196C | 94ZnO, 6ZrO$_2$ (Treated with 5% NaOH) | Fused Zirconia | 1.5 | 750 | 92.3 | 6.9 | 1.16 | |
| 214 | 94ZnO, 6ZrO$_2$ (Treated with NH$_4$OH) | Fused Zirconia | 1.5 | 750 | 95.0 | 2.2 | 1.6 | 1.2 |
| 169 | ZrO$_2$ fused | None | 1.5 | 750 | 13.9 | 81.6 | 4.4 | |
| 170 | ZnO | Fused Zirconia | 1.5 | 750 | 82.2 | 8.95 | 8.88 | |

The effectiveness of the fused zirconia base in minimizing olefin formation during the dehydrogenation of secondary alcohols is shown by the data in Table II wherein comparison is made with steel and brass carriers. In all cases the fused zirconia carrier with the same catalyst and under comparable conditions, converted less alcohol to olefin than either the steel or brass carrier.

*Table II*

| Carrier | Catalyst | Percent Alcohol Converted to Olefin | |
|---|---|---|---|
| | | Minimum | Maximum |
| Steel | 94ZnO:6Na$_2$CO$_3$ | 0.75 | 1.4 |
| Brass | do | 0.80 | 2.5 |
| Fused Zirconia | do | 0.60 | 1.0 |
| Steel | 94ZnO:6Bi$_2$O$_3$ | 1.0 | 2.6 |
| Brass | do | 1.5 | 4.0 |
| Fused Zirconia | do | 0.8 | 1.8 |

Although the effectiveness of the fused zirconia as a catalyst base has been demonstrated by the dehydrogenation of secondary alcohols to secondary alcohols to ketones are well described in the art, e. g. U. S. 2,039,543, 2,393,510, 2,436,733, 2,436,970, etc. and are illustrated in the preferred manner by the runs set forth in Table I of the specification.

What is claimed is:

1. A dehydrogenation catalyst comprising a group II metal oxide in an amount sufficient to catalyze dehydrogenation reactions coated on lumps of fused zirconia obtained from the distillation of zirconia sands.

2. A dehydrogenation catalyst comprising a group II metal oxide in an amount sufficient to catalyze dehydrogenation reactions coated on alkali-treated lumps of fused zirconia obtained from the distillation of zirconia sands.

3. A dehydrogenation catalyst comprising zinc oxide in an amount sufficient to catalyze dehydrogenation reactions and 1–15% by weight based on the total weight of the catalyst of a promoter selected from the group consisting of oxides of the metals of group IV and V of the periodic system coated on lumps of fused zirconia obtained from the distillation of zirconia sands.

4. A dehydrogenation catalyst comprising zinc oxide in an amount sufficient to catalyze dehydrogenation reactions and 1–15% by weight based on the total weight of the catalyst of a promoter selected from the group consisting of oxides of the metals of group IV and V of the periodic system coated on alkali-treated lumps of fused zirconia obtained from the distillation of zirconia sands.

5. A dehydrogenation catalyst comprising zinc oxide in an amount sufficient to catalyze dehydrogenation reactions and 1–15% by weight of the total oxides of bismuth oxide coated on lumps of fused zirconia obtained from the distillation of zirconia sands.

6. A dehydrogenation catalyst comprising zinc oxide in an amount sufficient to catalyze dehydrogenation reactions and 1–15% by weight of the total oxides of zirconium oxide coated on lumps of fused zirconia obtained from the distillation of zirconia sands.

References Cited in the file of this patent

UNITED STATES PATENTS

| Number | Name | Date |
|---|---|---|
| 2,331,915 | Kirkpatrick | Oct. 19, 1943 |
| 2,436,733 | Schneider et al. | Feb. 24, 1948 |
| 2,436,970 | Mistretta | Mar. 2, 1948 |
| 2,451,350 | Mottern et al. | Oct. 12, 1948 |
| 2,487,466 | Nahin | Nov. 8, 1949 |
| 2,633,475 | Mottern | Mar. 31, 1953 |